United States Patent [19]

Katto et al.

[11] 4,352,910
[45] Oct. 5, 1982

[54] VINYL CHLORIDE RESIN COMPOSITION WITH MULTI-STAGE IMPACT MODIFIER

[75] Inventors: Takayuki Katto; Zenya Shiiki, both of Iwaki, Japan

[73] Assignee: Kureha Kagaku Kogyo Kabushiki Kaisha, Tokyo, Japan

[21] Appl. No.: 313,198

[22] Filed: Oct. 20, 1981

[30] Foreign Application Priority Data

Oct. 23, 1980 [JP] Japan .............................. 55-148729

[51] Int. Cl.³ ...................... C08L 51/04; C08L 27/06
[52] U.S. Cl. ......................................... 525/83; 525/79; 525/81; 525/82; 525/84; 525/310; 525/902
[58] Field of Search ...................... 525/80, 83, 84, 82, 525/902

[56] References Cited

U.S. PATENT DOCUMENTS

| 3,644,250 | 2/1972 | Ide et al. | 525/83 |
| 3,886,232 | 5/1975 | Tanaka et al. | 525/83 |
| 3,899,547 | 8/1975 | Amagi et al. | 525/83 |
| 3,959,895 | 6/1976 | Lonning | 525/83 |

Primary Examiner—Carman J. Seccuro
Attorney, Agent, or Firm—Wenderoth, Lind & Ponack

[57] ABSTRACT

As an impact modifier copolymer to be blended with a vinyl chloride resin, a multilayer copolymer comprising a hard core polymer containing a relatively small quantity of a conjugated diene, a rubbery inner layer polymer containing a relatively large quantity of a conjugated diene, and an outer layer polymer comprising, for example, a copolymer of styrene and methyl methacrylate which is compatible with a vinyl chloride resin is used, whereby a vinyl chloride resin composition well balanced between impact strength and anti-stress-whitening property can be obtained.

13 Claims, No Drawings

VINYL CHLORIDE RESIN COMPOSITION WITH MULTI-STAGE IMPACT MODIFIER

BACKGROUND OF THE INVENTION

The present invention relates generally to a vinyl chloride resin composition, and more particularly to a vinyl chloride resin composition which possesses improved impact strength and can also provide resin products less liable to be stress-whitened upon deformation due, for example, to bending.

It has hitherto been known in the art that the impact strength of vinyl chloride resin products can be improved by blending with the polyvinyl chloride resin a graft copolymer obtained by polymerizing one or more vinyl monomers such as styrene, acrylonitrile and methyl methacrylate in the presence of a rubbery material. The vinyl chloride resin composition thus obtained has fairly satisfactory transparency and impact strength, but a formed product of the resin composition, when bent or folded, is liable to be stress-whitened around the portion at which the product is bent or folded. Especially, a formed resin product possessing high impact strength tends to be stress-whitened notably whereby the commercial value of the product is impaired.

In general, it is difficult to obtain impact strength and anti-stress-whitening property at the same time. There has been an attempt to improve both these properties by suitably coagulating a rubber latex and graft-polymerising thereonto styrene, methyl methacrylate and the like as is disclosed in Japanese Patent Pub. No. 31462/1971 and Japanese Patent Pub. No. 1584/1979, but the suitable coagulation of the latex requires a high level of technology and thus a simple method has been desired.

SUMMARY OF THE INVENTION

A principal object of the present invention is to provide a vinyl chloride resin composition which has high impact strength and can also provide resin products least liable to be stress-whitened even upon bending.

The present inventors have found that this object can be achieved by using as an impact modifier polymer for vinyl chloride resins a copolymer obtained by forming at the first stage a polymer comprising a minor quantity of conjugated diene monomer units, forming at the second stage a rubbery polymer layer so as to cover partially or completely the core polymer particles obtained at the first stage, and forming at the third stage a layer of a hard polymer compatible with a vinyl chloride resin so as to constitute an outer layer on the spherical polymer particles obtained at the second stage.

The vinyl chloride resin composition according to the present invention has been accomplished on the basis of the above finding and, more particularly, comprises 60 to 97% (by weight, as in all percentages and parts set forth hereinafter) of a vinyl chloride resin; and 3 to 40% of an impact modifier copolymer comprising (1) 10 to 60 parts of a core polymer comprising 5 to 49% of a conjugated diene, 41 to 95% of a monoethylenically unsaturated monomer selected from the group consisting of aromatic vinyl monomers and mixtures thereof with alkyl acrylates or alkyl methacrylates, and 0 to 10% of a crosslinking agent, (2) 20 to 75 parts of an inner layer polymer formed on the core polymer and comprising 60% or more of a conjugated diene, 0 to 5% of a crosslinking agent, and a remainder of a monoethylenically unsaturated monomer selected from the group consisting of aromatic vinyl monomers and mixtures thereof with alkyl arcylates or alkyl methacrylates, and (3) 15 to 50 parts of an outer layer polymer formed on the inner layer polymer and comprising 0 to 10% of a crosslinking agent and a remainder of a monomer mixture selected from mixtures of an alkyl acrylate and an aromatic vinyl monomer and mixtures of an alkyl methacrylate, an aromatic vinyl monomer and an unsaturated nitrile, the sum of the quantities of the polymers (1), (2) and (3) amounting to 100 parts.

The core polymer in the impact modifier polymer used in the present invention comprises a smaller quantity of a conjugated diene monomer than the rubbery inner layer polymer, and thus is a relatively hard polymer. The impact strength modifier polymer comprising a hard core polymer can impart higher anti-stress-whitening property to a vinyl chloride resin composition possessing substantially the same level of impact strength than an ordinary impact strength modifier comprising no such core polymer, i.e., comprising a core polymer made of a rubber or a core polymer and an inner layer polymer both made of a rubber of the same quality. It is essential in the present invention that a conjugated diene be used in the core polymer so that the vinyl chloride resin composition will have both improved impact strength and anti-stress-whitening property. In the case where the core polymer does not comprise a conjugated diene and only the inner layer polymer comprises a rubber component including a conjugated diene, the composition will have satisfactory impact strength but the anti-stress-whitening property thereof will be poorer than when the core polymer comprises a conjugated diene.

The composition obtained in accordance with the present invention has the advantageous features of high impact strength coupled with improved anti-stress-whitening property, and can also have excellent transparency if the ratio of the monomers for the modifier copolymer is suitably selected so that the refractive index of the copolymer will be close to that of the vinyl chloride resin to be blended therewith.

Further, the composition according to the present invention, by reducing the quantity of the outer layer within the scope of the invention, can exhibit high impact strength even at a temperature as low as 0° C. as opposed to a conventional composition which possesses high impact strength ordinarily at around room temperature but tends to show poorer impact strength at such a low temperature as 0° C.

DETAILED DESCRIPTION OF THE INVENTION

The copolymer of the present invention for use as an impact modifier polymer for vinyl chloride resins comprises 10 to 60 parts of a core polymer comprising 5 to 49%, preferably 7 to 45%, of a conjugated diene, 41 to 95%, preferably 45 to 93%, of an aromatic vinyl monomer or a mixture thereof with an alkyl acrylate or an alkyl methacrylate, and 0 to 10% of a crosslinking agent. This core polymer can be easily obtained in latex form by conventional emulsion polymerization in the presence of a suitable emulsifier and initiator.

For the aromatic vinyl monomers, styrene is most preferred, but α-methyl styrene, isopropenyl naphthalene, vinyl naphthalene, alkyl-substituted styrene such as 3,4-dimethylstyrene and vinyltoluene, or halosubstituted styrene such as p-bromostyrene and chlorostyrene can also be used.

For the conjugated dienes, butadiene is most preferred, but isoprene and 2,3-dimethyl butadiene are also suitable.

For the alkyl methacrylates, those having 1 to 4 carbon atoms in the alkyl group may be used among which methyl methacrylate is preferred but ethyl methacrylate, n-propyl methacrylate and n-butyl methacrylate can also be employed.

For the alkyl acrylates, those having 1 to 8 carbon atoms in the alkyl group, for example, methyl acrylate, ethyl acrylate, butyl acrylate and 2-ethyl hexyl acrylate, are preferable.

The alkyl methacrylate or alkyl acrylate used in the form of a mixture with an aromatic vinyl monomer is effective in lowering the refractive index of the impact modifier copolymer, particularly of the core polymer and thus improving the transparency of the vinyl chloride resin composition. In view of this, the alkyl methacrylate or alkyl acrylate is preferably used in combination with an aromatic vinyl monomer and a conjugated diene in a quantity sufficient to provide a core polymer having a refractive index close to that of the vinyl chloride resin, and is ordinarily used in a quantity of 0 to 80% of the total weight of these monomers and the aromatic vinyl monomer.

The use of a minor quantity of a conjugated diene in the core polymer in the impact modifier copolymer is essential in order to obtain a vinyl chloride resin composition having improved anti-stress-whitening property coupled with high impact strength, and the quantity required is 5 to 49% of the monomer mixture charged at the first-stage polymerization, i.e. at the stage of forming the core polymer. Less than 5% of the conjugated diene cannot impart satisfactory anti-stress-whitening property. Above 49%, the first-stage polymer constituting the core of the impact modifier copolymer becomes too soft to function as a hard core and the anti-stress-whitening property becomes poor.

The crosslinking agent, which may be optionally used, can effectively harden the core polymer, and is used in a quantity of not exceeding 10%, preferably from 0.01 to 9% of the core polymer.

Examples of the crosslinking agent are divinylbenzene, trivinylbenzene, allyl esters such as allyl methacrylate, triallyl isocyanurate, triallyl cyanurate and diallyl maleate, vinyl esters of polybasic acids such as divinyl adipate, vinyl ethers of polyhydric alcohols such as divinyl ethers of ethylene glycol, and acrylic or methacrylic esters of polyhydric alcohols such as ethylene glycol dimethacrylate, propylene glycol dimethacrylate, ethylene glycol diacrylate and trimethylolpropane trimethacrylate.

The core polymer must be harder than the rubbery inner layer polymer formed thereon, and must comprise a hard rubber or plastics. Accordingly, it is preferable that this core polymer have a glass transition temperature of not lower than $-15°$ C.

At the second stage for producing the inner layer polymer, 20 to 75 parts of a monomer mixture comprising 60% or more conjugated diene, 0 to 5% of a crosslinking agent, and a remainder of an aromatic vinyl monomer or a mixture thereof with an alkyl acrylate or an alkyl methacrylate is polymerized with 10 to 60 parts of the core polymer obtained at the first stage. Emulsion polymerization is carried out at this second stage similarly as in the case of the first stage, if desired, in the presence of an additional initiator and emulsifier.

The conjugated diene, aromatic vinyl monomer, alkyl acrylate and alkyl methacrylate are the same as those used for the formation of the core polymer, a preferred conjugated diene being butadiene and a preferred aromatic vinyl monomer being styrene.

The polymer formed at the second stage must be rubbery, and thus the conjugated diene is used in a quantity of 60% or more, preferably 60 to 95%, of the monomer mixture. The aromatic vinyl monomer, alkyl acrylate and alkyl methacrylate give the remainder of the monomer mixture, and are added preferably in a quantity of 5 to 35%.

The alkyl methacrylate or alkyl acrylate is used to obtain an inner layer polymer having improved polarity and coating property, and added optionally in a quantity of 0 to 80% of the total weight of this monomer and the aromatic vinyl monomer.

The crosslinking agent may again be used at the second stage to improve the rubbery properties of the inner layer polymer in a quantity of 0 to not exceeding 5%, preferably 0.01 to 4.5%. If more than 5% of the crosslinking agent is added, the rubber becomes too hard, resulting in a poor impact strength imparting effect.

The second-stage polymerization provides a latex of polymer particles in which the core polymer particles obtained at the first stage are partially or completely covered with the rubbery inner layer polymer obtained at the second stage.

The third-stage polymerization comprises adding to the latex of the intermediate polymer particles obtained at the second stage 15 to 50 part of a monomer mixture selected from mixtures of an alkyl methacrylate and an aromatic vinyl monomer and mixtures of an alkyl methacrylate, an aromatic vinyl monomer and an unsaturated nitrile at one time or several times and polymerizing the resultant mixture to form an outer layer polymer. Emulsion polymerization is carried out also at this stage, if desired, in the presence of an additional initiator and the like.

The aromatic vinyl monomer and alkyl methacrylate are the same as those used for the formation of the core polymer, a preferred aromatic vinyl monomer being styrene and a preferred alkyl methacrylate being methyl methacrylate.

In order to promote the uniform dispersion of the impact modifier copolymer in the vinyl chloride resin when melt-mixed therewith, a crosslinking agent similar to those mentioned above may be used at the third stage in a quantity of not exceeding 10%, preferably 0.01 to 8%. In case more than 10% of the crosslinking agent is used, the effect of imparting impact strength to the resin composition becomes poor. At the third stage where a mixture of an alkyl methacrylate and an aromatic vinyl monomer is used, a small quantity of an unsaturated nitrile may be added to enhance the compatibility of the impact modifier polymer with the vinyl chloride resin. For the unsaturated nitrile, acrylonitrile and methacrylonitrile, for example, can be used.

This third-stage polymerization provides polymer particles in which the rubbery inner polymer layer obtained at the second stage is for the most parts or completely covered with a hard outer layer polymer.

It is preferable that the ratio between the alkyl methacrylate and the aromatic vinyl monomer be 10 to 90%, particularly 15 to 85% to 90 to 10%, particularly 85 to 15%. The unsaturated nitrile, if desired, is used in a quantity of 40% or less, preferably 30% or less. At the third stage, 15 to 50 parts of the aforesaid monomer mixture may be added and polymerized either at one time or at several times. When the monomer mixture is polymerized stepwise, improved anti-stress-whitening property and impact strength can be obtained if the last monomer charge is enriched with an alkyl methacrylate. It is most desirable from the viewpoint of the compatibility with the vinyl chloride resin that 15 to 50 parts of the monomer mixture to be charged at the third stage be divided into two batches: first, 50 to 90% of the total third-stage monomer charge of a monomer mixture comprising 0 to 10% of a crosslinking agent, 10 to 90% of an alkyl methacrylate and 90 to 10% of an aromatic vinyl monomer is polymerized, and then 50 to 10% of a monomer comprising 90 to 100% of an alkyl methacrylate and 0 to 10% of a cross linking agent is polymerized. It is of course possible to add to each of the batches an unsaturated nitrile of the quantity specified above.

The quantity of the first-stage core polymer is 10 to 60 parts, preferably 15 to 55 parts. The quantity of the monomers used for the formation of the second-stage inner layer polymer (which can be regarded as substantially identical with the quantity of the inner layer polymer since the polymerization yield is nearly 100%) is 20 to 75 parts, preferably 25 to 70 parts. The quantity of the monomers used for the formation of the third-stage outer layer polymer (which can also be regarded as substantially identical with the quantity of the outer layer polymer since the polymerization yield is nearly 100%) is 15 to 50 parts, preferably 17.5 to 40 parts. Herein, the sum of the quantities of the polymers obtained at the three stages amounts to 100 parts. Less than 10 parts of the core polymer can hardly exhibit the effect of imparting high impact strength coupled with improved anti-stress-whitening property, while this polymer in excess of 60 parts will impart only poor impact strength because the quantity of the inner layer polymer becomes insufficient. Further, if the quantity of the inner layer polymer is less than 20 parts, the quantity of the rubber becomes insufficient whereby the impact strength imparting effect will be poor. Above 75 parts, the quantity of the core polymer will be reduced, resulting in poor anti-stress-whitening property. In the case where the quantity of the outer layer polymer is less than 15 parts, the polymer obtained will be liable to agglomerate when subjected to salting out, acid precipitation or drying after the last-stage polymerization, while more than 50 parts of this outer layer polymer will have a poor impact strength imparting effect.

For the vinyl chloride resin to be blended with the impact modifier copolymer obtained in the manner described above, polyvinyl chloride, a copolymer of 70% or more vinyl chloride and an ethylenically unsaturated monomer copolymerizable therewith, or a mixture thereof can be used. Examples of monomers copolymerizable with the vinyl chloride are vinyl acetate, vinylidene chloride, acrylic acid, ethyl acrylate, ethylene, and propylene. The vinyl chloride resins can be those obtained by conventional methods such as suspension polymerization and emulsion polymerization.

With 60 to 97% of the vinyl chloride resin, 3 to 40% of the impact modifier copolymer is blended. If the quantity of the impact modifier copolymer is less than 3%, the desired impact strength imparting effect cannot be obtained, while in case this polymer is added in a quantity exceeding 40%, the innate properties of the vinyl chloride resin will be lost.

Blending can be effected by conventional methods, for example, in a roll mill or a Bumbury's mixer. A method which involves blending the impact modifier copolymer latex with a vinyl chloride resin latex, and subjecting the polymer blend to salting out or acid precipitation can also be utilized.

If desired, heat stabilizers, antioxidants, lubricants and like additives may be added to the resin composition of the present invention.

In order to indicate more fully the nature and utility of this invention, the following specific examples of practice constituting preferred embodiments of the invention and comparison examples are set forth, it being understood that these examples are presented as illustrative only and not intended to limit the scope of the invention.

EXAMPLES 1 and 2

200 parts of water, 0.002 part of $FeSO_4.7H_2O$ (activator), 0.0033 part of a sodium salt of ethylenediaminetetraacetic acid (hereinafter abbreviated to EDTA) (chelating agent), 0.109 part of sodium pyrophosphate (latex viscosity controlling agent), 0.07 part of Rongalit (formaldehyde sodium sulfoxylate, reducing agent), 10 parts of styrene (abbrev. St), 10 parts of methyl methacrylate (abbrev. MMA), 5 parts of butadiene (abbrev. Bu), 0.08 part of divinylbenzene (abbrev. DVB), 0.07 part of diisopropylbenzene hydroperoxide (abbrev. HPO, initiator), and varying quantities (0.3 to 0.2 part) of potassium oleate (abbrev. OLK, emulsifier) were charged into a polymerization vessel. The mixture was subjected to polymerization at 60° C. for 16 hours to obtain a first-stage latex. The yield was nearly 100%. This first-stage polymer was found to have a glass transition temperature of 21° C. as measured by means of a differential scanning calorimeter (DSC, mfd. by Rigaku Denki K. K., Japan) at a temperature rising rate of 20° C./min.

To the latex obtained was added OLK so that the sum of the quantities of the OLK's added at the first stage and this stage would amount to 0.9 part, and thereafter the pH of the latex was adjusted to 10.

To the resulting latex were added 34.5 parts of Bu, 10.5 parts of St, 0.45 part of DVB, 10 parts of water, 0.045 part of Rongalit, and 0.09 part of HPO, and the reaction mixture was subjected to polymerization at 45° C. for 16 hours. In the case of the latex prepared by adding 0.2 part of OLK at the first stage, 0.05 part each of Rongalit and HPO were further added and polymerization was conducted at 45° C. for 16 hours. The particle sizes of the polymers in the latexes prepared by adding 0.2 part and 0.3 part respectively of OLK at the first stage were 1800 Å (Example 1) and 1350 Å (Example 2) as measured after the rubber polymerization.

To each of the latexes obtained were added 11.5 parts of MMA, 10.55 parts of St, 0.11 part of DVB, 0.05 part of HPO, 0.05 part of Rongalit, and 10 parts of water, and polymerization was conducted at 60° C. for 5 hours. To each of the resulting latexes were further added 7.5 parts of MMA, 0.0375 part of DVB, 0.025 part of HPO, 0.025 part of Rongalit, and 10 parts of water, and polymerization was continued at 60° C. for another 5 hours.

To the latexes thus obtained was added a phenolic antioxidant (2,6-ditertiarybutyl paracresol), and the latexes were precipitated with hydrochloric acid, filtered and dried. As a result, two types of powdery four-stage-polymerized MMA-St-Bu copolymers (abbrev. MBS) were obtained in an overall yield of 97.5 to 98.5%.

COMPARISON EXAMPLES 1 and 2

MBS's were prepared as follows:

The procedure of the first-stage polymerization in Examples 1 and 2 was repeated except that 19.2 parts of Bu, 0.25 part of DVB and varying quantities (0.1 part and 0.125 part) of OLK were used, and polymerization was carried out at 45° C. for 16 hours. To the latex obtained were added 0.05 part each of Rongalit and HPO, the polymerization was conducted at 60° C. for 5 hours.

To the resulting latex was added OLK so that the sum of the quantities of the OLK's added at the first stage and this stage would amount to 0.9 part, and then were added 34.5 parts of Bu, 10.5 parts of St, 0.45 part of DVB, 10 parts of water, 0.045 part of Rongalit, and 0.09 part of HPO, the polymerization was conducted at 45° C. for 16 hours.

Thereafter, 0.05 part of Rongalit and 0.09 part of HPO were added and polymerization was conducted at 60° C. for another 16 hours. The particle sizes of the polymers in the latexes prepared by adding 0.1 part and 0.125 part respectively of OLK at the first stage were 1800 Å (Comparison Example 1) and 1350 Å (Comparison Example 2) as measured at this stage.

The latexes were subsequently subjected to third- and fourth-stage polymerization in the same manner as in Example 1, whereupon four-stage-polymerized MBS's were obtained in a yield of 98 to 99%.

These Comparison Examples correspond to the cases where no MMA but a larger quantity of butadiene was used in the first-stage polymerization.

12.5% each of the four types of MBS's obtained in the manner described above and 87.5% of polyvinyl chloride (abbrev. PVC) of a polymerization degree of 700 containing 2% of octyltin mercaptate (stabilizer) were kneaded with rolls at 160° C. for 4 min. and press-formed at 200° C. and 150 Kg/cm² to prepare sheets of 6 mm thickness (for Izod impact strength tests) and 1 mm thickness (for transparency and stress-whitening tests).

The polymer sheets of 6 mm thickness thus prepared were formed into specimens with V-notches, and the Izod impact strength of each specimen was measured at 23.5° C. in accordance with JIS K-7110. The parallel ray transmittance (Tp) and haze (H) of the polymer sheet of 1 mm thickness were measured by means of a hazeometer, Model TC-HIII with C-filter manufactured by Tokyo Denshoku K. K., Japan.

Separately, the polymer sheets were cut to a size of 1 mm thickness, 20 mm width and 50 mm length, and the bending-whitening property of each so cut sheet was tested at room temperature at a bending rate of 150 rpm and a bending angle of 130°. A ball drop whitening test was also conducted by dropping a stainless-steel cylinder with a hemisphere of a diameter of 1 cm having a weight of 500 g at the end portion from a height of 50 cm down to a polymer sheet sample of 1 mm thickness.

TABLE 1

| | Particle size as measured after second-stage polymerization | Stress-whitening property | | Impact strength (Kg · cm/cm) | Transparency | |
|---|---|---|---|---|---|---|
| | | Bending | Ball drop | | Tp (%) | H (%) |
| Example 1 | 1800 Å | slight | slight | 115 | 86.1 | 3.4 |
| Example 2 | 1350 | extremely slight | extremely slight | 89 | 86.1 | 2.8 |
| Comparison Example 1 | 1800 | extremely pronounced | extremely pronounced | 88 | — | — |
| Comparison Example 2 | 1350 | slight | slight | 53 | — | — |

EXAMPLE 3

200 parts of water, 0.002 part of $FeSO_4 \cdot 7H_2O$, 0.0033 part of a sodium salt of EDTA, 0.109 part of sodium pyrophosphate, 0.15 part of OLK, 16 parts of St, 4 parts of Bu, 0.064 part of DVB, 0.07 part of HPO and 0.05 part of Rongalit were charged into a polymerization vessel, and subjected to polymerization at 60° C. for 16 hours to obtain a polymer having a glass transition temperature of 33° C.

To the latex thus obtained was added 0.85 part of OLK, and then were added 38.5 parts of Bu, 11.0 parts of St, 0.5 part of DVB, 10 parts of water, 0.07 part of Rongalit, and 0.135 part of HPO, and polymerization was carried out at 45° C. for 16 hours. The particle size of the polymer in the latex obtained at this stage was 1400 Å.

To this latex were added 22 parts of MMA, 5 parts of St, 3 parts of acrylonitrile, 0.148 part of DVB, 0.075 part of HPO, 0.075 part of Rongalit, and 10 parts of water, and polymerization was continued at 60° C. for 6 hours.

The polymer obtained was subjected to a post-treatment under the same conditions as in Example 1 to obtain a three-stage-polymerized copolymer in a yield of 98%.

This copolymer was blended in a proportion of 10% and 12.5% respectively of the resulting blends with the same polyvinyl chloride as was used in Example 1, and each of the resulting polymer blends was kneaded with rolls at 180° C. for 4 min. Each polymer blend thus kneaded was press-formed as in Example 1, and the impact strength and transparency of the sheets obtained were measured. The results are shown in Table 2.

The polymer sheets were stress-whitened very slightly upon bending, showing excellent anti-stress-whitening property.

The thickness of the polymer sheet samples and the measurement conditions were the same as in Example 1.

TABLE 2

| Izod impact strength (Kg · cm/cm) | | | Transparency (Parallel ray transmittance) | | |
|---|---|---|---|---|---|
| 160° C. roll | | 180° C. roll | 160° C. roll | | 180° C. roll |
| 10% MBS | 12.5% MBS | 12.5% MBS | 10% MBS | 12.5% MBS | 12.5% MBS |
| 45 | 63 | 46 | 87.6% | 87.4% | 88.6% |

TABLE 3

| | Izod impact strength (Kg · cm/cm) 23.5° C. | Transparency | | Stress-whitening property |
|---|---|---|---|---|
| | | Tp (%) | H (%) | |
| Example 4 | 66 | 88.3 | 1.3 | extremely slight |
| Comparison Example 3 | 71 | 84.5 | 2.6 | pronounced |
| Comparison Example 4 | 80 | 86.2 | 2.2 | extremely pronounced |

EXAMPLE 4

The first- and second-stage polymerization reactions were conducted under the same conditions as in Example 3 to obtain a two-stage-polymerized polymer latex.

To this latex were added 17.5 parts of MMA, 5 parts of St, 0.11 part of DVB, 10 parts of water, 0.05 part of HPO, and 0.05 part of Rongalit, and polymerization was conducted at 60° C. for 5 hours.

To the latex obtained were added 7.5 parts of MMA, 0.0375 part of DVB, 10 parts of water, 0.025 part of HPO, and 0.025 part of Rongalit, and polymerization was further conducted at 60° C. for 5 hours.

The polymer thus obtained was subjected to a post-treatment under the same conditions as in the preceding Examples to obtain a four-stage-polymerized MBS in a yield of 99.5%.

COMPARISON EXAMPLE 3

A four-stage-polymerized MBS was obtained in a yield of 98% in the same manner as in Example 4 except that 20 parts of St and 0.064 part of DVB were used as polymerizing components and that no Bu was added in the first-stage polymerization.

COMPARISON EXAMPLE 4

A four-stage-polymerized MBS was obtained in a yield of 98% in the same manner as in Example 4 except that 4 parts of St, 16 parts of Bu and 0.064 part of DVB were used as polymerizing components while 0.1 part of OLK was added as an emulsifier in the first-stage polymerization and that 15 parts of St, 7.5 parts of MMA and 0.0375 part of DVB were used as polymerizing components in the third-stage polymerization.

The particle sizes of the polymers obtained at the second stage were 1400 Å in Example 4, 1500 Å in Comparison Example 3 and 1450 Å in Comparison Example 4.

Comparison Example 4 corresponds to the case where a large quantity of Bu was used in the first-stage polymerization.

This MBS was blended in a proportion of 10% with the same PVC as was used in Example 1, and the polymer blend obtained was kneaded with rolls at 160° C. for 4 min. The thus kneaded polymer blend was press-formed at 200° C. to prepare sheets of 6 mm thickness (for Izod impact strength tests) and 1 mm thickness (for transparency and anti-stress-whitening property tests).

The results of the impact strength, transparency and anti-whitening property tests on these polymer sheet samples are set forth in Table 3. The measurement conditions employed were the same as in Example 1.

EXAMPLE 5

210 parts of water, 0.0021 part of FeSO$_4$.7H$_2$O, 0.0035 part of a sodium salt of EDTA, 0.053 part of sodium pyrophosphate, 0.115 part of Rongalit, 0.158 part of OLK, 16.84 parts of St, 4.21 parts of Bu, 0.067 part of DVB, and 0.074 part of HPO were charged into a polymerization vessel, and subjected to polymerization at 60° C. for 16 hours.

To the latex obtained was added 0.79 part of OLK, and subsequently were added 40.53 parts of Bu, 11.58 parts of St, 0.53 part of DVB, 10 parts of water, 0.074 part of Rongalit, and 0.142 part of HPO, and polymerization was conducted at 45° C. for 18 hours. The particle size of the polymer in the latex obtained at this stage was 1200 Å.

To this latex were added 15.1 parts of MMA, 4.2 parts of St, 0.0968 part of DVB, 10 parts of water, 0.0526 part of Rongalit, and 0.0789 part of HPO, and polymerization was carried out at 60° C. for 5 hours.

To the latex thus obtained were further added 7 parts of MMA, 0.033 part of DVB, 0.026 part of Rongalit, 0.026 part of HPO, and 10 parts of water, and polymerization was further conducted at 60° C. for 5 hours.

As a result, a four-stage-polymerized MBS was obtained in a yield of 98.5%.

COMPARISON EXAMPLE 5

110 parts of water, 0.0011 part of FeSO$_4$.7H$_2$O, 0.00183 part of a sodium salt of EDTA, 0.0028 part of sodium pyrophosphate, 0.061 part of Rongalit, 0.105 part of OLK, 7.58 parts of styrene, 1.89 parts of Bu, 0.031 part of DVB, and 0.039 part of HPO were charged into a polymerization vessel, and subjected to polymerization at 60° C. for 16 hours.

To the latex thus obtained were added 0.42 part of OLK and 30 parts of water, and then were added 49.45 parts of Bu, 14.13 parts of St, 0.63 part of DVB, 0.055 part of Rongalit, 0.158 part of HPO, and 10 parts of water. The resulting mixture was subjected to polymerization at 45° C. for 18 hours to obtain a latex having a polymer particle size of 1200 Å.

To this latex were added 16.1 parts of MMA, 6.89 parts of styrene, 0.11 part of DVB, 0.053 part of Rongalit, 0.053 part of HPO, 10 parts of water, and 0.06 part of OLK, and polymerization was conducted at 60° C. for 5 hours.

To the latex obtained were added 3.3 parts of MMA, 0.0166 part of DVB, 0.026 part of Rongalit, 0.026 part of HPO, and 10 parts of water, and polymerization was further conducted at 60° C. for 5 hours. The yield was 99%. This Comparison Example was a copolymer comprising a minor proportion of the first-stage polymer.

10% of this copolymer and the PVC used in Example 1 were kneaded with rolls at 160° C. for 4 min., and press-formed at 200° C. to prepare sheets of 6 mm thickness (Izod impact strength tests) and 1 mm thickness (for transparency and anti-stress-whitening property tests).

The results of the impact strength, transparency and anti-stress-whitening property tests on these polymer sheet samples conducted under the same conditions as in Example 1 are shown in Table 4.

TABLE 4

|  | Izod impact strength (Kg.cm/cm) 23.5° C. | Transparency Tp (%) | H (%) | Stress-whitening property |
|---|---|---|---|---|
| Example 5 | 52 | 89.5 | 1.0 | trace |
| Comparison Example 5 | 58 | 87.9 | 2.0 | extremely pronounced |

EXAMPLES 6 and 7

A two-stage-polymerized polymer latex was prepared by conducting the first- and second-stage polymerization reactions under the same conditions as in Example 5 except that 0.115 part of sodium pyrophosphate and 0.053 part of Rongalit were used at the first stage.

To this latex were added 15.37 parts of MMA, 4.42 parts of St, 0.0968 part of DVB, 10 parts of water, 0.0526 part of Rongalit, and 0.0526 part of HPO, and polymerization was carried out at 60° C. for 5 hours.

To the latex obtained were added 6.53 parts of MMA, 0.033 part of DVB, 10 parts of water, 0.026 part of Rongalit, and 0.026 part of HPO, and polymerization was further carried out at 60° C. for 5 hours.

The polymer thus obtained was subjected to a post-treatment under the same conditions as in the preceding Examples to obtain a four-stage-polymerized MBS copolymer in a yield of 99% (Example 6).

Separately, a four-stage-polymerized MBS copolymer different in composition from the MBS of Example 6 was obtained by the following procedure (Example 7).

220 parts of water, 0.0022 part of FeSO$_4$.7H$_2$O, 0.0037 part of a sodium salt of EDTA, 0.121 part of sodium pyrophosphate, 0.056 part of Rongalit, 0.17 part of OLK, 17.78 parts of St, 4.44 parts of Bu, 0.07 part of DVB, and 0.078 part of HPO were charged into a polymerization vessel, and subjected to polymerization at 60° C. for 16 hours.

To the latex obtained was added 0.83 part of OLK, and then were added 42.78 parts of Bu, 12.22 parts of St, 0.56 part of DVB, 10 parts of water, 0.078 part of Rongalit, and 0.15 part of HPO, and polymerization was further conducted at 45° C. for 18 hours.

To the latex obtained at this stage were added 13.33 parts of MMA, 3.33 parts of St, 0.08 part of DVB, 0.083 part of HPO, 0.056 part of Rongalit, and 10 parts of water, and polymerization was conducted at 60° C. for 5 hours.

To the resulting latex were further added 5.56 parts of MMA, 0.028 part of DVB, 0.028 part of Rongalit, and 0.028 part of HPO, and polymerization was conducted at 60° C. for another 5 hours. The yield was 99% (Example 7).

The copolymers thus obtained in proportions of 10% and 12.5% respectively and the PVC used in Example 1 were kneaded with rolls at 160° C. or 180° C. for 4 min., and press-formed at 200° C. in the manner described in Example 1.

The results of the impact strength, transparency and anti-stress-whitening property tests on the polymer sheet samples are set forth in Table 5. The thickness of the samples and the measurement conditions were the same as in the preceding Examples.

Comparison Example 1 described previously is shown in Table 5 again as a control.

TABLE 5

|  | Izod impact strength (Kg.cm/cm) | | | Transparency | | | | | | Stress-whitening property |  |
|---|---|---|---|---|---|---|---|---|---|---|---|
|  | 160° C. roll | | 180° C. roll | 160° C. roll | | | | 180° C. roll | | 160° C. roll |  |
|  | 10% MBS | 12.5% MBS | 12.5% MBS | 10% MBS | | 12.5% MBS | | 12.5% MBS | | MBS 10% |  |
|  | 23.5° C. | 23.5° C. 0° C. | 23.5° C. | Tp (%) | H (%) | Tp (%) | H (%) | Tp (%) | H (%) | Ball drop | Bending |
| Example | 61 | 69  31 | 59 | 88.5 | 1.7 | 88 | 1.8 | 88.4 | 1.6 | slight | extremely slight |
| Example 7 | 65 | 72  55 | 68 | 88.5 | 1.4 | 87.9 | 1.7 | 88.9 | 1.1 | extremely slight | slight |
| Comparison Example 1 | 44 | 88  16 | — | — | — | — | — | — | — | extremely pronounced | extremely pronounced |

EXAMPLE 8

220 parts of water, 0.0022 part of FeSO$_4$.7H$_2$O, 0.0037 part of a sodium salt of EDTA, 0.121 part of sodium pyrophosphate, 0.056 part of Rongalit, 17.78 parts of St, 2.22 parts of 2-ethylhexyl acrylate, 2.22 parts of Bu, 0.11 part of DVB, 0.22 part of OLK, and 0.078 part of HPO were charged into a polymerization vessel, and subjected to polymerization at 60° C. for 16 hours.

To the latex obtained was added 0.83 part of OLK, and were further added 42.78 parts of Bu, 9.22 parts of St, 3 parts of MMA, 0.56 part of DVB, 10 parts of water, 0.078 part of Rongalit, and 0.15 part of HPO, and polymerization was conducted at 50° C. for 20 hours.

To the resulting latex were added 13.33 parts of MMA, 3.33 parts of St, 0.08 part of DVB, 0.083 part of HPO, 0.056 part of Rongalit, and 10 parts of water, and polymerization was continued at 60° C. for 5 hours.

To the latex thus obtained were added 5.56 parts of MMA, and 0.028 part each of DVB, Rongalit and HPO. The mixture was subjected to polymerization at 60° C. for 5 hours to obtain a four-stage-polymerized copolymer in a yield of 98.5%.

The glass transition temperature of the first-stage polymer as measured by means of a DSC was 42.5° C., and the particle size of the polymer in the latex obtained at the second stage was about 1250 Å.

The four-stage-polymerized copolymer in a proportion of 12.5% and the PVC used in Example 1 were kneaded with rolls at 165° C. for 4 min., and press-formed at 200° C. similarly as in the preceding Examples.

The Izod impact strength of a polymer sheet sample with a V-notch was 73 Kg.cm/cm, and the Tp and H of other samples prepared from the same polymer blend were 89.4% and 1%, respectively. This copolymer was stress-whitened very slightly both upon ball dropping and bending, thus exhibiting remarkable anti-stress-whitening property.

The thickness of the samples tested and the measurement conditions employed were the same as in the preceding Examples.

For reference, the monomer compositions at the respective stages in the Examples and Comparison Examples described hereinabove are summarized in Table 6 below.

TABLE 6

| | First Stage | | | | | Second Stage | | | | Third Stage | | | | Fourth Stage | |
|---|---|---|---|---|---|---|---|---|---|---|---|---|---|---|---|
| | St | MMA | Bu | DVB | 2EHA* | Bu | St | MMA | DVB | MMA | St | AN | DVB | MMA | DVB |
| Exs. 1,2 | 10 | 10 | 5 | 0.08 | — | 34.5 | 10.5 | — | 0.45 | 11.5 | 10.55 | — | 0.11 | 7.5 | 0.0375 |
| Comp. Exs. 1,2 | 5.8 | — | 19.2 | 0.25 | — | 34.5 | 10.5 | — | 0.45 | 11.5 | 10.55 | — | 0.11 | 7.5 | 0.0375 |
| Ex. 3 | 16 | — | 4 | 0.064 | — | 38.5 | 11.0 | — | 0.5 | 22 | 5 | 3 | 0.148 | — | — |
| Ex. 4 | 16 | — | 4 | 0.064 | — | 38.5 | 11.0 | 0.5 | 17.5 | 5 | — | 0.11 | 7.5 | 0.0375 | |
| Comp. Ex. 3 | 20 | — | — | 0.064 | — | 38.5 | 11.0 | — | 0.5 | 17.5 | 5 | — | 0.11 | 7.5 | 0.0375 |
| Comp. Ex. 4 | 4 | — | 16 | 0.064 | — | 38.5 | 11.0 | — | 0.5 | 7.5 | 15 | — | 0.0375 | 7.5 | 0.0375 |
| Ex. 5 | 16.84 | — | 4.21 | 0.067 | — | 40.53 | 11.58 | — | 0.53 | 15.1 | 4.2 | — | 0.0968 | 7 | 0.033 |
| Comp. Ex. 5 | 7.58 | — | 1.89 | 0.031 | — | 49.45 | 14.13 | — | 0.63 | 16.1 | 6.89 | — | 0.11 | 3.3 | 0.0166 |
| Ex. 6 | 16.84 | — | 4.21 | 0.067 | — | 40.53 | 11.58 | — | 0.53 | 15.37 | 4.42 | — | 0.0968 | 6.53 | 0.033 |
| Ex. 7 | 17.78 | — | 4.44 | 0.07 | — | 42.78 | 12.22 | — | 0.56 | 13.33 | 3.33 | — | 0.08 | 5.56 | 0.028 |
| Ex. 8 | 17.78 | — | 2.22 | 0.11 | 2.22 | 42.78 | 9.22 | 3 | 0.56 | 13.33 | 3.33 | — | 0.08 | 5.56 | 0.028 |

*2EHA: 2-ethyl hexyl acrylate

We claim:

1. A vinyl chloride resin composition with improved impact strength and anti-stress-whitening property comprising:
   60 to 97% of a vinyl chloride resin; and
   3 to 40% of an impact modifier copolymer comprising:
   (1) 10 to 60 parts of a core polymer comprising 5 to 49% of a conjugated diene, 41 to 95% of a monoethylenically unsaturated monomer selected from the group consisting of aromatic vinyl monomers and mixtures thereof with alkyl acrylates or alkyl methacrylates, and 0 to 10% of a crosslinking agent,
   (2) 20 to 75 parts of an inner layer polymer formed on the core polymer and comprising 60% or more conjugated diene, 0 to 5% of a crosslinking agent, and a remainder of a monoethylenically unsaturated monomer selected from the group consisting of aromatic vinyl monomers and mixtures thereof with alkyl acrylates or alkyl methacrylates, and
   (3) 15 to 50 parts of an outer layer polymer formed on the inner layer polymer and comprising 0 to 10% of a crosslinking agent and a remainder of a monomer mixture selected from mixtures of an alkyl acrylate and an aromatic vinyl monomer and mixtures of an alkyl methacrylate, an aromatic vinyl monomer and an unsaturated nitrile,
   the sum of the quantities of the polymers (1), (2) and (3) amounting to 100 parts,
all quantities expressed in percentages and parts being by weight.

2. A vinyl chloride resin composition as claimed in claim 1, wherein the outer layer polymer has been obtained by polymerizing at one step 15 to 50 parts of a monomer mixture comprising 0 to 10% of the crosslinking agent, 0 to 40% of the unsaturated nitrile, and a remainder of the mixture of the alkyl methacrylate and the aromatic vinyl monomer.

3. A vinyl chloride resin composition as claimed in claim 1, wherein the outer layer polymer has been obtained by two steps, the first step comprising polymerizing a monomer mixture of 0 to 10% of the crosslinking agent, 0 to 40% of the unsaturated nitrile and a remainder of the mixture of the alkyl methacrylate and the aromatic vinyl monomer, and the second step comprising polymerizing a monomer mixture of 0 to 10% of the crosslinking agent, 0 to 50% of the unsaturated nitrile and a remainder of the alkyl methacrylate.

4. A vinyl chloride resin composition as claimed in claim 3, wherein 50 to 90% of the outer layer polymer is obtained by the first step and 50 to 10% of said polymer is obtained by the second step.

5. A vinyl chloride resin composition as claimed in any of claims 1 through 4, wherein the core polymer is a copolymer comprising 7 to 45% of the conjugated diene, 45 to 93% of the monoethylenically unsaturated monomer, and 0.01 to 9% of the crosslinking agent.

6. A vinyl chloride resin composition as claimed in any of claims 1 through 5, wherein, as constituents of the core polymer, the conjugated diene is butadiene, the monoethylenically unsaturated monomer is selected from the group consisting of styrene and mixtures of styrene and methyl methacrylate, and the crosslinking agent is divinylbenzene.

7. A vinyl chloride resin composition as claimed in any of claims 1 through 6, wherein the core polymer has a glass transition temperature of not lower than −15° C.

8. A vinyl chloride resin composition as claimed in any of claims 1 through 7, wherein the inner layer polymer is a copolymer comprising 65 to 95% of the conjugated diene, 5 to 35% of the monoethylenically unsaturated monomer, and 0.01 to 4.5% of the crosslinking agent.

9. A vinyl chloride resin composition as claimed in any of claims 1 through 8, wherein, as constituents of the inner layer polymer, the conjugated diene is butadiene, the monoethylenically unsaturated monomer is selected from the group consisting of styrene and mixtures of styrene and methyl methacrylate, and the crosslinking agent is divinylbenzene.

10. A vinyl chloride resin composition as claimed in any of claims 1 through 9, wherein the outer layer polymer is a copolymer comprising 15 to 85% of the alkyl methacrylate, 15 to 85% of the aromatic vinyl monomer, and 0 to 30% of acrylonitrile.

11. A vinyl chloride resin composition as claimed in any of claims 1 through 10, wherein, as constituents of the outer layer polymer, the alkyl methacrylate is methyl methacrylate, the aromatic vinyl monomer is styrene, and the unsaturated nitrile is acrylonitrile.

12. A vinyl chloride resin composition as claimed in any of claims 1 through 11, wherein the impact modifier polymer comprises 15 to 55 parts of the core polymer, 25 to 70 parts of the inner layer polymer, and 17.5 to 40 parts of the outer layer polymer, the sum of the quantities of the polymers amounting to 100 parts.

13. A vinyl chloride resin composition as claimed in any of claims 1 through 12, wherein the vinyl chloride resin is polyvinyl chloride or a copolymer of 70% or more vinyl chloride and an ethylenically unsaturated monomer copolymerizable therewith.

* * * * *